Inventor:
Walter Mizen.
by John F. Schmidt
Attorney.

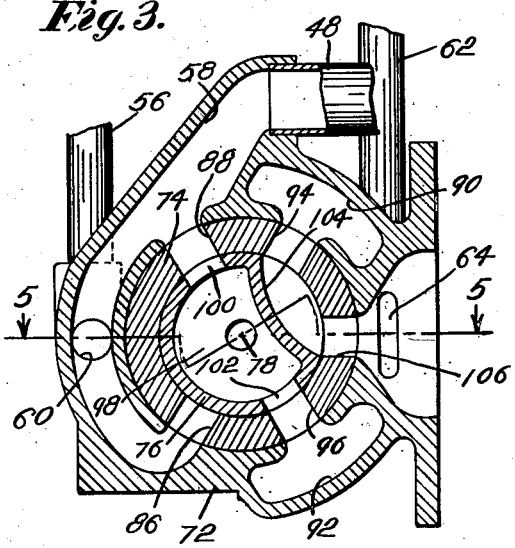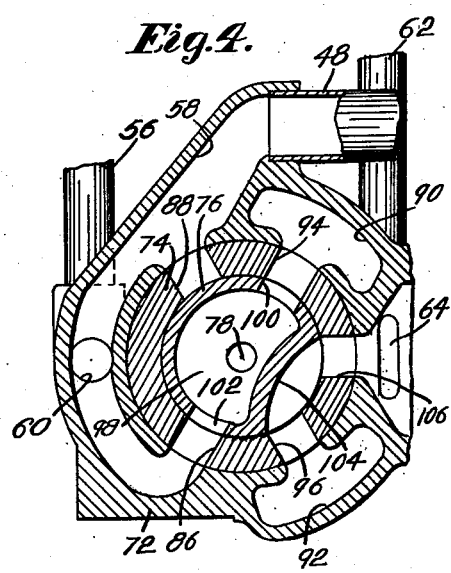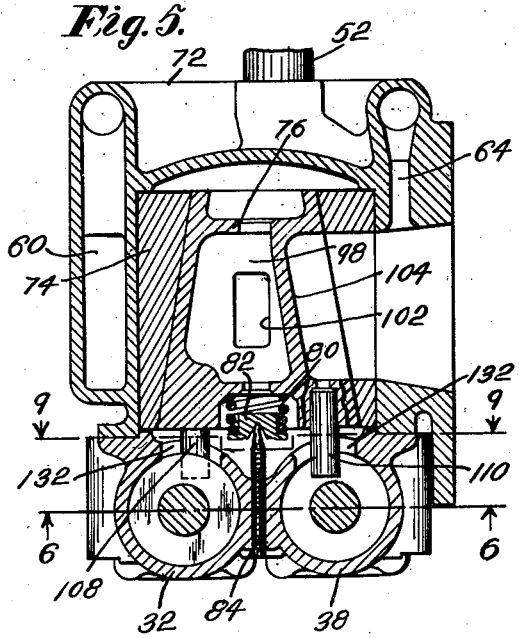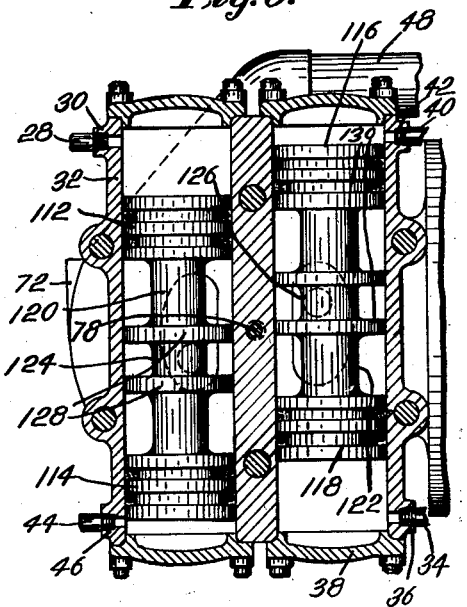

May 19, 1953 — W. MIZEN — 2,638,926
VALVE ACTUATING MECHANISM
Filed Oct. 18, 1950 — 3 Sheets-Sheet 3

Inventor:
Walter Mizen.
by John F. Schmidt
Attorney.

Patented May 19, 1953

2,638,926

UNITED STATES PATENT OFFICE 2,638,926

VALVE ACTUATING MECHANISM

Walter Mizen, Michigan City, Ind., assignor to Joy Manufacturing Company, Pittsburgh, Pa., a corporation of Pennsylvania Application October 18, 1950, Serial No. 190,745

7 Claims. (Cl. 137—658)

This invention relates to valve actuating mechanism, especially to a valve of the oscillating plug type.

A valve made according to this invention is used in conjunction with the reversing heat exchangers of an oxygen generator of the general type disclosed in patent application Serial No. 122,077, filed October 18, 1949, but it will, of course, be understood that the invention is not limited to such an application.

In reversing valves of the type referred to, it is desirable that the valve be quick acting, that it be operable with a minimum of power, and that the wear be reduced to a minimum to keep maintenance costs at a low level and the keep shutdowns to a minimum. It is accordingly an object of this invention to provide valve actuating mechanism which operates efficiently and rapidly and which produces a minimum of wear in the valve. This and other objects are accomplished in a reversing valve of the tapered plug type having actuating pins in one end of the valve engaged by double acting cylinders such that the turning force on the valve itself has a zero linear resultant.

In the drawings:

As shown in Fig. 1, the pilot valve mechanism is shown in top plan, while the valve itself is shown in side elevation.

Fig. 3 is a transverse section through the valve showing the rotatable valve body in one operating position.

Fig. 4 is a view similar to Fig. 3, but showing the rotatable valve body in its other operating position.

Fig. 5 is a view in section substantially on line 5—5 of Fig. 3.

Fig. 6 is a view in section substantially on line 6—6 of Fig. 5.

Figure 1:
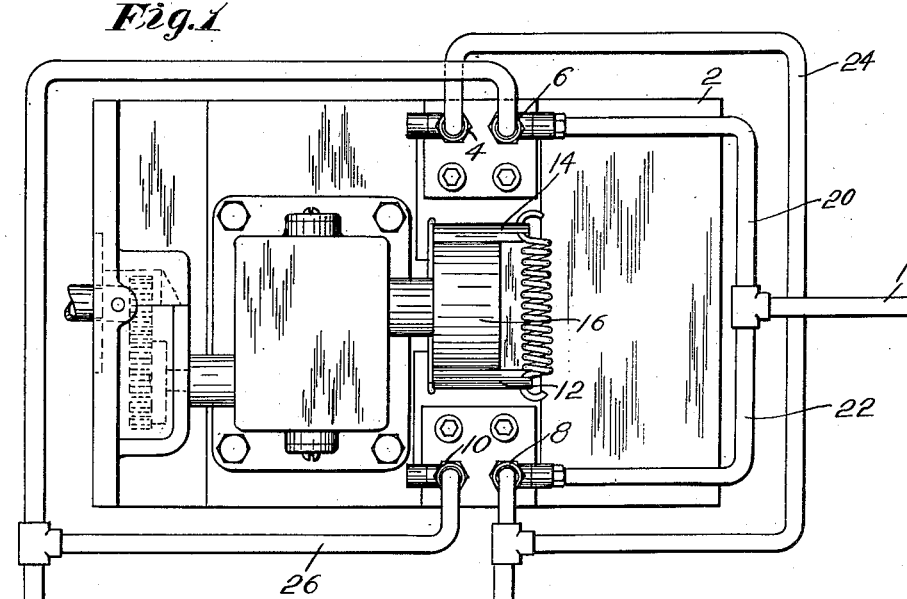
Fig. 1 is a view of the pilot valve mechanism and the reversing valve with its valve actuating mechanism.
Figure 2:
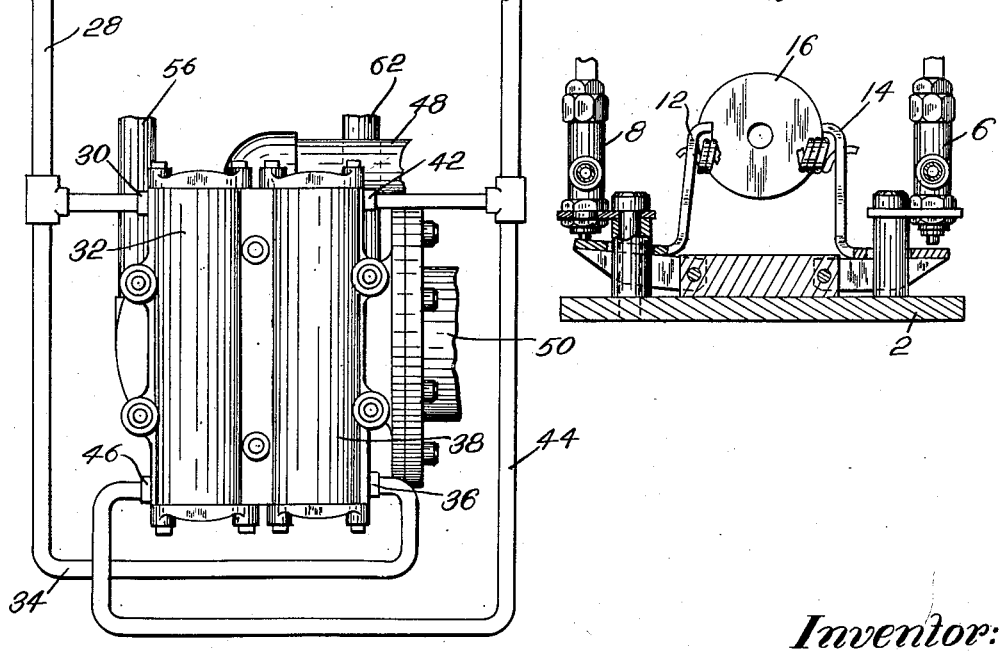
Fig. 2 is an end elevation view of the pilot valve mechanism.
Figure 7:
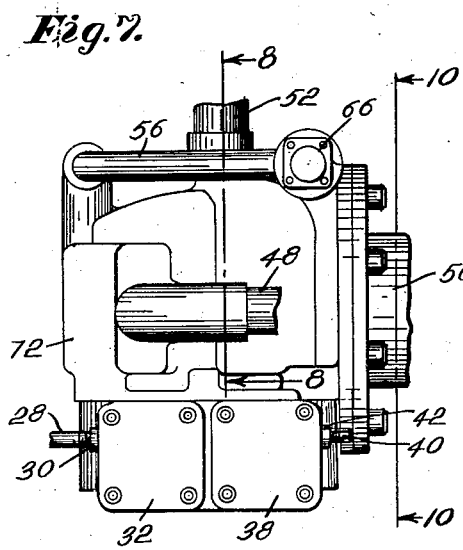
Fig. 7 is a top plan view of the valve and its actuating mechanism on a smaller scale.
Figure 8:
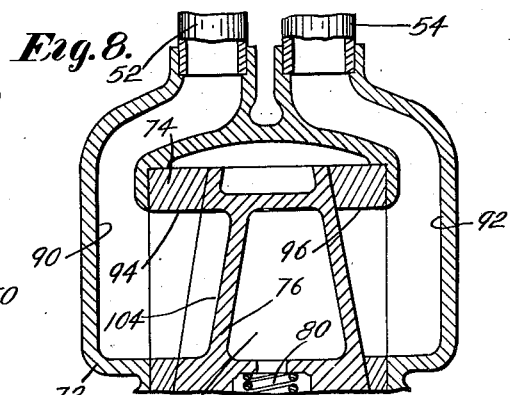
Fig. 8 is a partial sectional view substantially on line 8—8 of Fig. 7.
Figure 9:
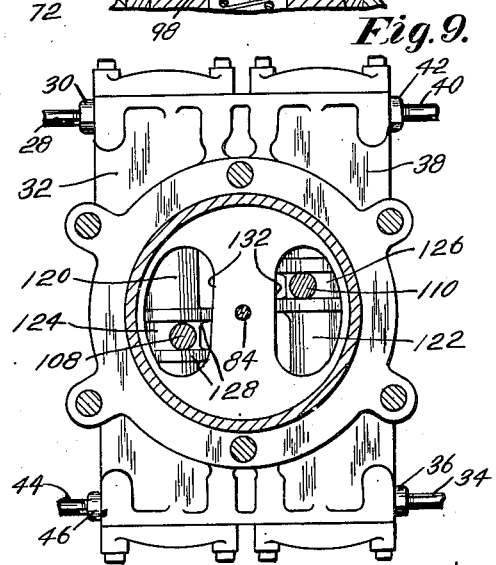
Fig. 9 is a view in section substantially on line 9—9 of Fig. 5.

The pilot valve mechanism shown in Figs. 1 and 2 is disclosed and claimed in the patent application of Win W. Paget, Serial No. 35,092, filed June 25, 1948, and assigned to the assignee of this invention. In view of the description of the pilot valve mechanism in the patent application of Paget identified above, the description thereof in this application will be somewhat abridged.

The pilot valve mechanism is mounted on a base 2 and includes four simple spring-biased valves 4, 6, 8 and 10. The valves are actuated by rocker arms 12 and 14 which are controlled by a rotating cam 16. Valves 6 and 8 control the flow of high-pressure air from the conduit 18 and its branches 20 and 22 respectively, to the valve actuating cylinders, and pilot valves 4 and 10 control the venting of those cylinders by way of branches 24 and 26 respectively.

A conduit 28 leads from the discharge connection of valve 6 to a pressure fluid connection 30 of a cylinder 32 and, by way of a branch conduit 34, to a pressure fluid connection 36 of a second cylinder 38. Conduit 26 leads from valve 10 to the conduit 28.

A conduit 40 leads from valve 8 to a pressure fluid connection 42 at the upper end of cylinder 38 and, by way of a branch conduit 44, to a pressure fluid connection 46 at the lower end of cylinder 32.

Air under pressure is piped from the compressed air receiver to the valve by way of high-pressure conduit 48, and waste gases, consisting largely of nitrogen, are exhausted from the oxygen generator by way of exhaust conduit 50. Compressed air goes from the valve to the heat exchangers and waste gases come from the heat exchangers to the valve, by way of conduits 52 and 54. As will be understood by those skilled in the art, the air and waste gases alternate in flow through these two conduits as the reversing valve moves from one operating position to another.

Figure 11:
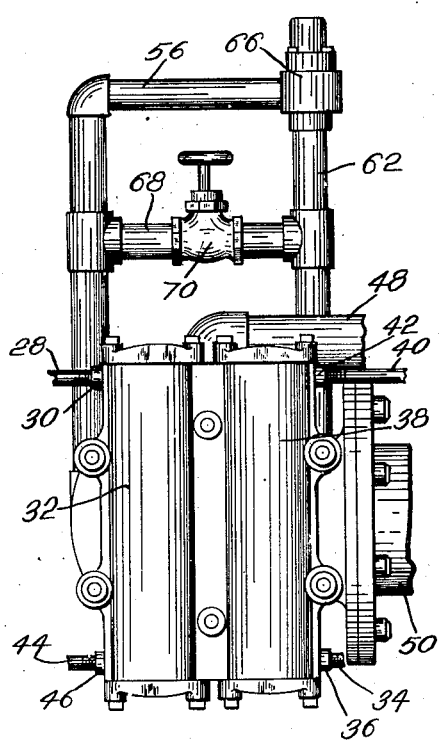
Fig. 11 is a side elevation view of the valve and its actuating mechanism similar to the view of the valve shown in Fig. 1, but with certain fluid connections not shown in Fig. 1.
Figure 10:
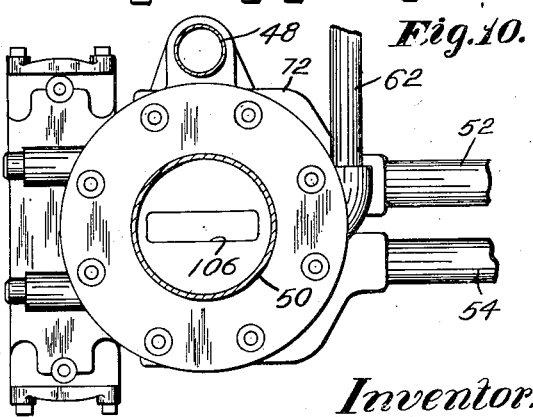
Fig. 10 is a view in section substantially on line 10—10 of Fig. 7, but rotated clockwise through 90°.

As is best seen in Fig. 3, a conduit 56 is always in communication with the high-pressure line 48 by way of passages 58 and 60, and a conduit 62 is always in communication with the discharging waste gases by way of passage 64. The conduits 56 and 62 are connected through a safety valve 66 (Fig. 11) which may be set to pop at any desired value above the desired operating pressure. In addition, a conduit 68 connects the conduits 56 and 62, but is normally closed by a valve 70.

The valve itself consists of a housing 72 provided with suitable passages and a liner 74, preferably carbon, provided with cooperating passages, and a rotatable valve body 76 oscillatable within the carbon liner 74 about an axis 78.

As is best seen in Fig. 5, the liner 74 is provided with a tapered bore and is adapted to receive the tapered plug or valve body 76. A spring 80 is positioned in a recess in one end of the plug 76, with one end bearing against the large end of the tapered plug 76, and its other end bearing against the spring seat 82. An adjusting screw 84 bears against seat 82 and permits adjustment of the amount of compression of spring 80 and thereby the tightness of the fit between the plug 76 and the liner 74.

The housing 72 is provided with the cored passage 58 referred to above (Fig. 3) which communicates at its one end with the high-pressure conduit 48, and at its other end with a radial passage 86 through the inner wall of the housing and through liner 74 to the interior or bore of the liner. Between the ends of the cored passage 58, the passage is in communication with the bore of the liner 74 by means of another radial passage 88 through the inner housing wall and the liner. Cored passages 90 and 92 are in communication with the conduits 52 and 54 respectively, and register with radial passages 94 and 96 through the inner wall of the housing and the liner.

The tapered plug 76 is hollow to provide an interior space 98 and is provided with radial passages 100 and 102 at opposite ends of a diameter. In addition, between the radial passages 100 and 102, the plug or valve body is provided with a concave recess 104. The recess 104 subtends enough of the periphery of the plug to span an arc extending between the extremes of a radial passage 106 and either of the radial passages 94 or 96. Thus, in Fig. 3 the concave recess 104 connects the radial passage 106 with the radial passage 94, and in Fig. 4 the concave recess 104 connects the radial passage 106 with the radial passage 96.

At its one end, here shown as the large end, the plug or valve body 76 is provided with a pair of valve operators 108 and 110. The actuating cylinders 32 and 38 are located adjacent the same end of the valve plug, preferably at opposite sides of a plane passing through the axis of rotation 78.

As is best seen in Fig. 6, each cylinder is provided with a pair of opposed pistons reciprocable in its bore. Thus, cylinder 32 is provided with suitably packed opposed pistons 112 and 114, and cylinder 38 is similarly provided with opposed pistons 116 and 118.

Pistons 112 and 114 are rigidly connected together by means comprising a piston rod 120, and the pistons 116 and 118 are rigidly connected together by means comprising a piston rod 122. The piston rods 120 and 122 have associated with them means to engage the valve operators 108 and 110.

The valve operator engaging means and the valve operators themselves consist, in the embodiment shown, of a pair of pins and cooperating grooves. Thus, in this embodiment, the valve operators 108 and 110 are pins secured in appropriate holes in the plug 76, and the valve operator engaging means consist of grooves 124 and 126, groove 124 being formed by a pair of spaced collars 128 on the piston rod 120, and groove 126 being formed by a pair of spaced collars 130 on the piston rod 122.

The two valve operators 108 and 110 (here shown as pins) are located on a line passing through the axis of rotation 78, with that axis lying between them. In fact, the axis 78 lies midway between the pins 108 and 110. The pins extend through openings 132 in the cylinders 32 and 38.

Operation

In operation, the compressed air always enters the system by way of conduit 48 and waste gases always leave the system by way of conduit 50. The compressed air and the waste gases alternate in passing through conduits 52 and 54.

In one operating position of the valve, the plug 76 is oriented as shown in Fig. 3. Compressed air enters the valve housing from conduit 48, passes through the cored passage 58 to the radial passage 86, through that passage and through the radial passage 100 in the plug 76, to the interior space 98 of the plug and out through the radial passages 102 and 88, through the cored passage 92, and to the reversing heat exchangers by way of conduit 54. Meanwhile, waste gases are received from the reversing heat exchangers by way of conduit 52, whence they pass to cored passage 90, through radial passage 94, through the concave recess 104, and through radial passage 106 out through the exhaust conduit 50.

As the cam 16 rotates, as described in the Paget application Serial No. 35,092 referred to above, it reaches the position shown in Fig. 2 in which the cam follower of rocker arm 12 drops into the cam recess and opens valves 8 and 10. Air under pressure is thereupon admitted from conduit 18 and branch conduit 22 through the valve 8, conduit 40, and connection 42 to the upper end of cylinder 38; and by way of branch conduit 44 and connection 46 to the lower end of cylinder 32. At the same time, the lower end of cylinder 38 is vented to atmosphere by way of connection 36, branch conduit 34, conduit 28, conduit 26, and pilot valve 10, and the upper end of cylinder 32 is likewise vented to atmosphere by way of connection 30, conduit 28, conduit 26 and pilot valve 10.

With the pilot valves in the positions referred to above, air under pressure is admitted to the operating faces of pistons 116 and 114, while the operating faces of pistons 112 and 118 are subjected to atmospheric pressure only. As a result, the pistons 116 and 118 will shift downward while the pistons 112 and 114 shift upward, effecting a clockwise oscillating movement of plug 76 from the position shown in Fig. 3 to the position shown in Fig. 4.

In this new position, air under pressure flows from conduit 48 through cored passage 58, radial passages 86 and 102, plug interior 98, radial passages 100 and 94, and cored passage 90 to conduit 52 and thence to the reversing heat exchangers. Meanwhile, waste gases flow from the reversing heat exchangers through conduit 54, cored passage 92, radial passage 96, concave recess 104 and radial passage 106 out to the atmosphere by way of exhaust gas conduit 50.

When cam 16 has rotated 180° from the position shown in Fig. 2, the cam follower of rocker arm 14 drops into the cam recess and opens pilot valves 4 and 6. Air under pressure is thereupon admitted to the operating face of piston 112 by way of branch conduit 20, pilot valve 6, conduit 28 and connection 30; and to the operating face of piston 118 by way of conduit 28, as aforesaid, branch conduit 34, and connection 36. Simultaneously, the operating faces of pistons 114 and 116 are vented to atmosphere, the venting of piston 114 being by way of connection 46, branch conduit 44, conduits 40 and 24, and pilot valve 4, and the venting of the working face of piston 116 being by way of connection 42, conduits 40 and 24 and pilot valve 4. In this new orientation of the pilot valves, the pistons 112, 114, 116 and 118 are shifted in their respective cylinders to oscillate the valve plug 76 counterclockwise, from the position shown in Fig. 4 to the position shown in Fig. 3, and the cycle is then ready to repeat itself.

With the arrangement shown, the valve plug 76 is moved by a couple consisting of equal and opposite acting forces operating upon the pins 108 and 110. Inasmuch as these pins are spaced equi-distant from the axis of rotation or oscillation, the net linear resultant of the forces acting on the valve is zero, with the result that the valve plug 76 and the liner 74 are subjected to a minimum of wear. In addition to the feature of a minimum of wear, there is also a minimum of resistance to motion of the valve plug in the liner, resulting in an efficient and rapid functioning of the valve.

It is apparent from the foregoing that this invention provides a much improved reversing valve having the advantage of minimum wear and efficient operation with a minimum of operating force. Other advantages will be apparent to those skilled in the art.

While there is in this application specifically described one form which the invention may assume in practice, it will be understood that this form of the same is shown for purposes of illustration, and that the invention may be modified and embodied in various other forms without departing from its spirit or the scope of the appended claims.

I claim:

1. A valve device including a valve having an axis of rotation and rotatable about said axis into at least two operating positions, actuating mechanism including a pair of valve operating pins associated with one end of the valve to apply a turning force having a zero linear resultant, a pair of actuating cylinders adjacent said end of the valve, a pair of alined pistons reciprocably mounted in each cylinder, means to connect the pistons in a cylinder together, means providing spaced shoulders associated with the last-named means to engage a pin, and pressure fluid connections for the cylinders.

2. Mechanism as in claim 1, in which said spaced shoulders are formed by a pair of spaced collars.

3. Mechanism as set forth in claim 2, and means including said connections to supply operating fluid under pressure to one end of one cylinder and to the opposite end of the other cylinder while venting those cylinder ends not under pressure.

4. Mechanism as in claim 3, in which the actuating cylinders are symmetrically disposed on opposite sides of a plane passing through said axis.

5. Mechanism as set forth in claim 1, and means including said connections to supply operating fluid under pressure to one end of one cylinder and to the opposite end of the other cylinder while venting those cylinder ends not under pressure.

6. Mechanism as in claim 5, in which the actuating cylinders are symmetrically disposed on opposite sides of a plane passing through said axis.

7. Mechanism as in claim 1, in which the actuating cylinders are symmetrically disposed on opposite sides of a plane passing through said axis.

WALTER MIZEN.

References Cited in the file of this patent

UNITED STATES PATENTS

| Number | Name | Date |
| --- | --- | --- |
| 679,437 | Stark | July 30, 1901 |
| 789,081 | Cravens | May 2, 1905 |
| 836,317 | Gerdes | Nov. 20, 1906 |
| 1,842,382 | Arey | Jan. 26, 1932 |
| 2,085,688 | Schuchman | June 29, 1937 |

FOREIGN PATENTS

| Number | Country | Date |
| --- | --- | --- |
| 287,884 | Italy | Aug. 14, 1931 |